United States Patent [19]

Okishima

[11] Patent Number: 5,659,333
[45] Date of Patent: Aug. 19, 1997

[54] SYSTEM AND METHOD FOR SCROLLING CONTROL

[75] Inventor: Haruhiro Okishima, Kawasaki, Japan

[73] Assignee: Fujitsu Limited, Kawasaki, Japan

[21] Appl. No.: 321,598

[22] Filed: Oct. 12, 1994

Related U.S. Application Data

[63] Continuation of Ser. No. 31,867, Mar. 16, 1993, abandoned.

[30] Foreign Application Priority Data

Mar. 16, 1992 [JP] Japan .................. 4-057957

[51] Int. Cl.⁶ ............................................. G09G 5/34
[52] U.S. Cl. ........................ 345/123; 345/129; 345/127; 395/341
[58] Field of Search .................... 345/123, 124, 345/125, 127, 128, 129, 130, 145, 157; 395/341

[56] References Cited

U.S. PATENT DOCUMENTS

| | | | |
|---|---|---|---|
| 4,714,918 | 12/1987 | Barker et al. | 345/123 |
| 4,837,729 | 6/1989 | Funahashi | 345/123 |
| 4,890,099 | 12/1989 | Takano | 345/123 |
| 5,172,102 | 12/1992 | Iwamura | 340/726 |
| 5,196,838 | 3/1993 | Meier | 345/123 |
| 5,386,218 | 1/1995 | Yano et al. | 345/129 |

FOREIGN PATENT DOCUMENTS

| | | |
|---|---|---|
| 2053177 | 6/1992 | Canada . |
| 0 163 032 | 12/1985 | European Pat. Off. . |
| 1-211793 | 8/1989 | Japan . |
| 1-216393 | 8/1989 | Japan . |
| 2-106797 | 4/1990 | Japan . |
| 2-310592 | 12/1990 | Japan . |
| 3-126080 | 5/1991 | Japan . |
| 3-185496 | 8/1991 | Japan . |
| 3-263094 | 11/1991 | Japan . |
| 4142594 | 5/1992 | Japan ............ 345/123 |

OTHER PUBLICATIONS

"Implicit Scrolling Via Cursor Type," *IBM Technical Disclosure Bulletin*, vol. 27, No. 12, May 1985, p. 6952.

Field, Tim. "Using MacWrite and MacPaint". McGraw–Hill 1984, pp. 9–10.

*Primary Examiner*—Xiao Wu
*Attorney, Agent, or Firm*—Staas & Halsey

[57] ABSTRACT

Scrolling control is carried out in response to a press of a cursor key or a scroll key. While a scroll control is carried out, data displayed on a screen is reduced, to thereby increase an amount of the data displayed at the same time.

7 Claims, 4 Drawing Sheets

Fig.3A
Fig.3B
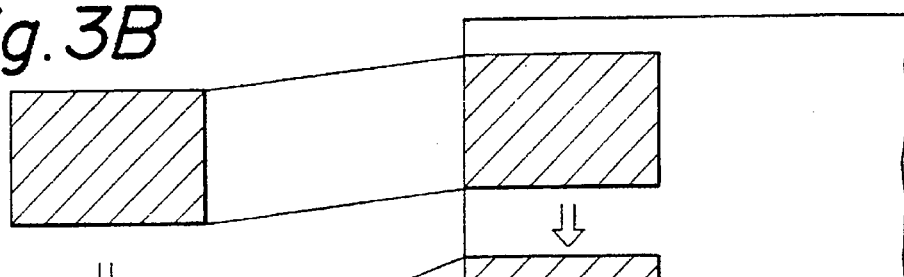
Fig.3C ⇓
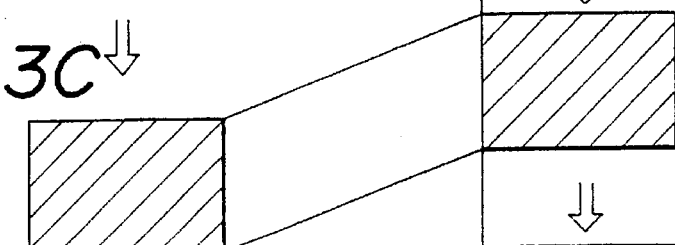
Fig.3D ⇓
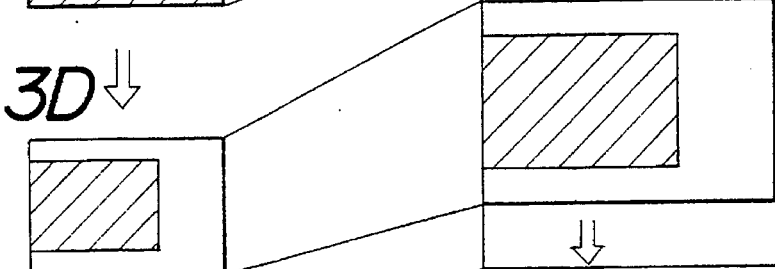
Fig.3E ⇓
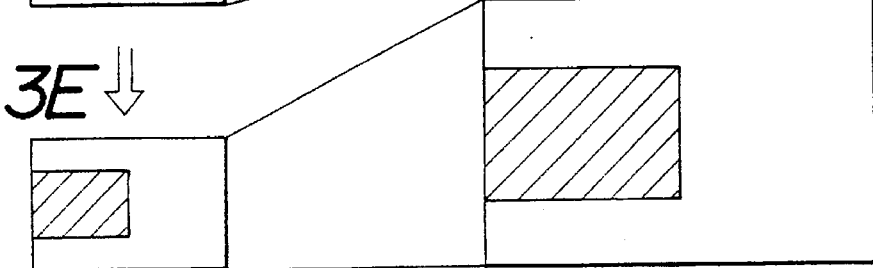
Fig.3F ⇓
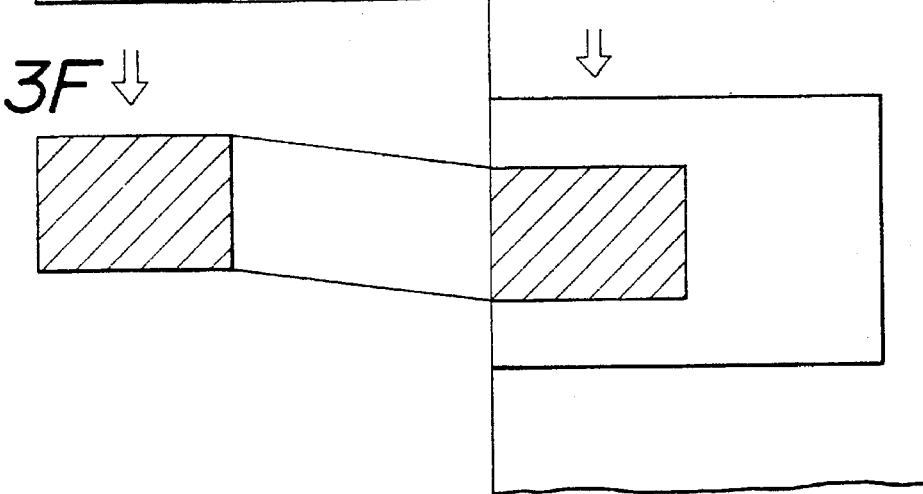

SYSTEM AND METHOD FOR SCROLLING CONTROL

This application is a continuation of application Ser. No. 08/031,867, filed Mar. 16, 1993, now abandoned.

BACKGROUND OF THE INVENTION

1. Field of the Invention

The present invention relates to a scrolling control system and a scrolling control method for performing scrolling control of a data display screen in a computer system wherein text data, displayed on a display device, are edited, etc.

2. Description of the Related Art

Generally, a scrolling function is provided in computer systems, etc., in order to vary a display position of a data display screen. The scrolling is a process of moving display data on the display screen in a designated direction when a scroll event occurs in response to a press of a cursor key or a scroll key on a keyboard or a click of a scroll bar with a mouse.

Scrolling is usually carried out by a dot, a line or a block of lines and a display scale is not varied throughout the scrolling process. In scrolling, it is desired to find a target screen and to display it at high speed. In the conventional scrolling control method, however, an amount of information displayed at the same time is limited. Since it is difficult to grasp the context from the limited amount of information or it is difficult to grasp a data structure, etc., the target screen can not easily be found.

SUMMARY OF THE INVENTION

It is an object of the present invention to provide a scrolling control system and a scrolling control method, wherein an amount of information displayed when scrolling is increased and a necessary screen can be found with ease and at high speed.

In accordance with the present invention, there is provided a scrolling control system, comprising a display device an input device, means for detecting an event of scrolling data displayed on the display device in response to an input from the input device, means for scrolling the data displayed on the display device when the scrolling event is received from the event detecting means and means for reducing the data scrolled by the scrolling means to thereby increase an amount of data displayed at the same time.

In accordance with the present invention there is also provided a scrolling control method in a computer system including a display device and an input device, comprising the steps of detecting an event of scrolling data displayed on the display device in response to an input from the input device, scrolling the data displayed on the display device when the scrolling event is received from the event detecting means and reducing the data scrolled by the scrolling means to thereby increase an amount of data displayed at the same time.

BRIEF DESCRIPTION OF THE DRAWINGS

FIGS. 3A to 3F are diagrams explaining reduced scrolling according to the present invention;

DESCRIPTION OF THE PREFERRED EMBODIMENTS

Figure 1:
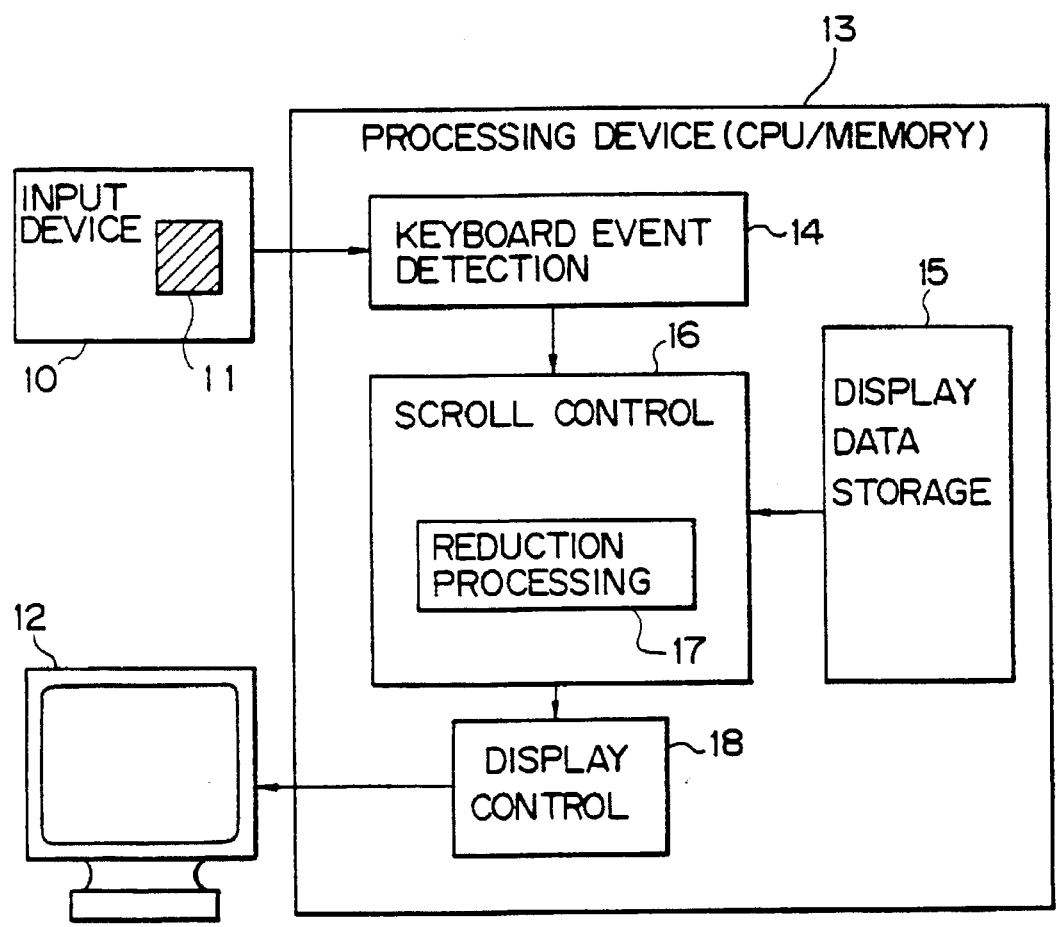
FIG. 1 is a block diagram of a computer system provided with a scrolling function according to the present invention.

FIG. 1 is a block diagram of a computer system provided with a scrolling function according to the present invention. The system includes an input device 10 such as a keyboard and/or a mouse, a display device 12 for displaying data, and a processing device 13 comprising of a CPU and a memory, etc. The input device 10 includes a reduced scrolling input 11, realized by a specific key or a specific combination of keys, etc. The processing device 13 includes a keyboard event detection unit 14, a display data storage unit 15 for storing display data such as text data to be edited, a scroll control unit 16, and a display control unit 18 for displaying specified data on the display device 12. The scroll control unit 16 further includes a reduction processing unit 17.

The keyboard event detection unit 14 detects a keyboard event in response to a press of a cursor key or a scroll key of the input device 10 or activation of the reduced scrolling input 11 or other input. The scroll control unit 16 performs a scroll process of moving displayed data in a designated direction when an event to execute the scroll process is detected by the keyboard event detection unit 14.

Figure 2:
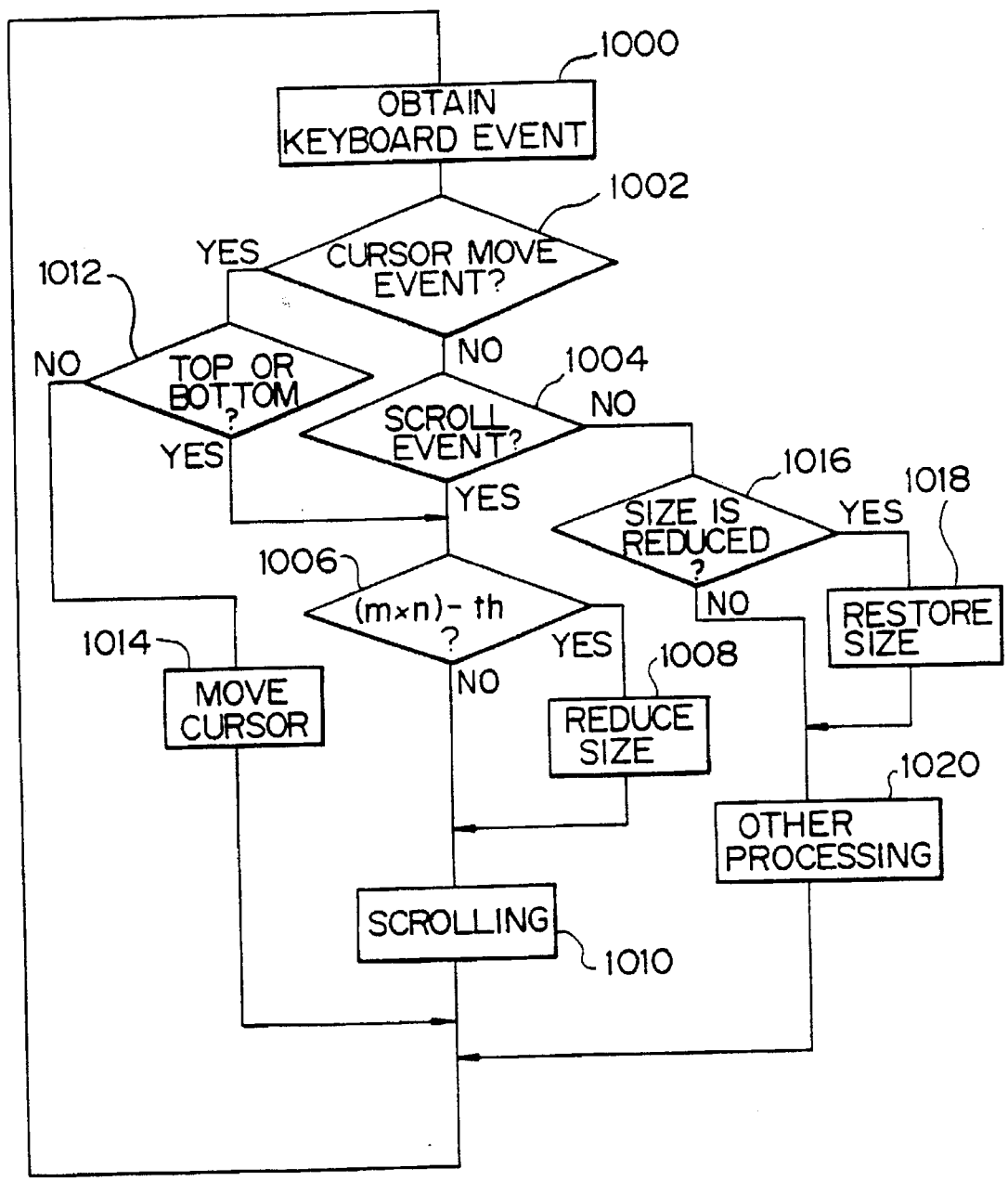
FIG. 2 is a flowchart showing an operation of the scroll control unit 16 of FIG. 1.

FIG. 2 shows a scroll process of the scroll control unit 16. In step 1000, a keyboard event is received from the keyboard event detection unit 14. If the received event is a scroll event in step 1004, it is examined whether the same events successively occur and the currently received event is an $(m \times n)$-th event of a series of the same events where $m = 1, 2 \ldots$, and n is an integer value that is preset in a system or that is set by a user in an environment definition, in step 1006. If the currently received event is the $(m \times n)$-th event, data displayed on the screen is reduced by a reducing factor in step 1008. In step 1010, scrolling of the display data is carried out in a designated direction.

In step 1002, if the received event is a cursor move event, it is examined whether a cursor resides at the top or bottom line in step 1012. If the event is one that moves the cursor upward and the cursor resides at the top line, the process is advanced to the step 1006, to perform up-scroll processing. If the event is one that moves the cursor downward and the cursor resides at the bottom line, the process is advanced to the step 1006, to perform down-scroll processing. In the other cases, in step 1014, the cursor is moved in a designated direction.

If the received event is not the cursor move event in step 1002 nor the scroll event in step 1004 (i.e., output when a scroll key is released), it is examined whether the size of the displayed data has been reduced in step 1016. If yes, the size of the displayed data is restored in step 1018. In step 1020, processing corresponding to the received event is carried out.

In the aforementioned example, the cursor move process and the scroll process are always accompanied by the reduction process. Alternatively, the scroll control unit 16 may be constituted so that the reduction occurs only while a specific key is pressed in combination with the cursor move key or the scroll key or only when the reduced scrolling input 11 is activated.

FIGS. 3A to 3F are diagrams for explaining the reduced scrolling according to the present invention. FIG. 3A represents text data stored in the display data storage unit 15, and FIG. 3B represents a screen of a basic (i.e., standard)

size before the scrolling process starts. As shown in FIG. 3C, when the scrolling process starts, a screen having the basic size is displayed. After a predetermined number of events occur, i.e., after a predetermined length of time elapses during the scroll process, data displayed on the screen is reduced as shown in FIG. 3D. Thus, a larger amount of data is displayed at the same time as shown in FIG. 3A. Thereafter, when another predetermined length of time elapses, data displayed on the screen is further reduced as shown in FIG. 3E. When the scroll process ends (i.e., when the scroll key is released, the size of data is restored to the basic size, as shown in FIG. 3F.

Figure 4:
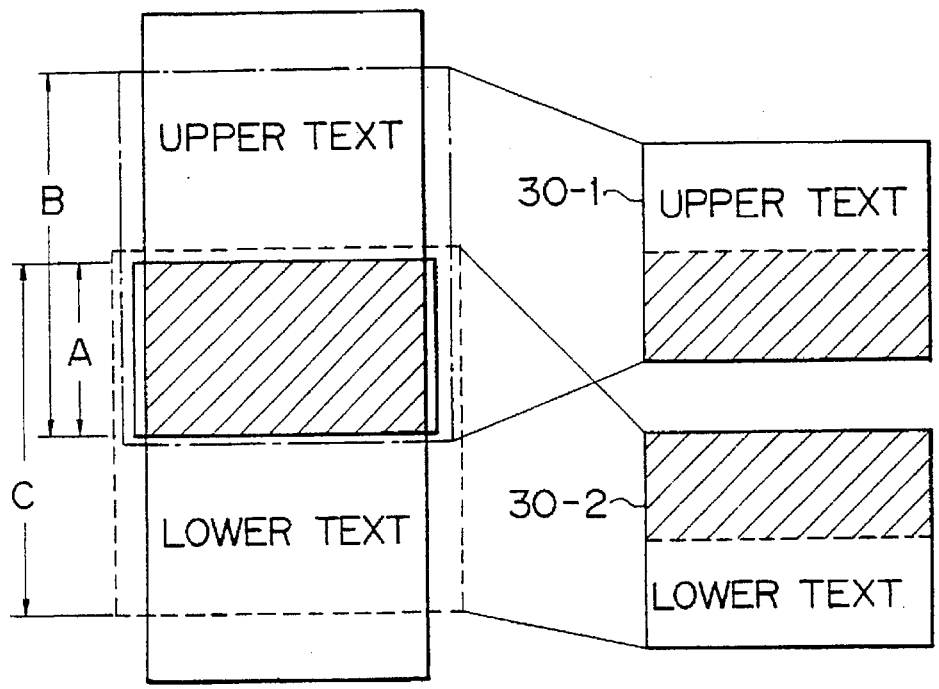
FIG. 4 is a diagram representing a reduction operation.

A reference line having a display position fixed in reduction and restoration operations can be customized by a user. FIG. 4 represents the reduction operations in two different cases i.e., one case where a bottom line is defined as the reference line and another case where a top line is defined as the reference line. It is assumed that a range A is a display range of text before the reduction operation is carried out. If a bottom line of the display range A is defined as the reference line, the display range is changed from A to B by the reduction operation, and a screen 30-1 is displayed. If a top line of the display range A is defined as the reference line, the display range is changed from A to C by the reduction operation, and a screen 30-2 is displayed. Though not shown, an intermediate line may be defined as the reference line.

Figure 5:
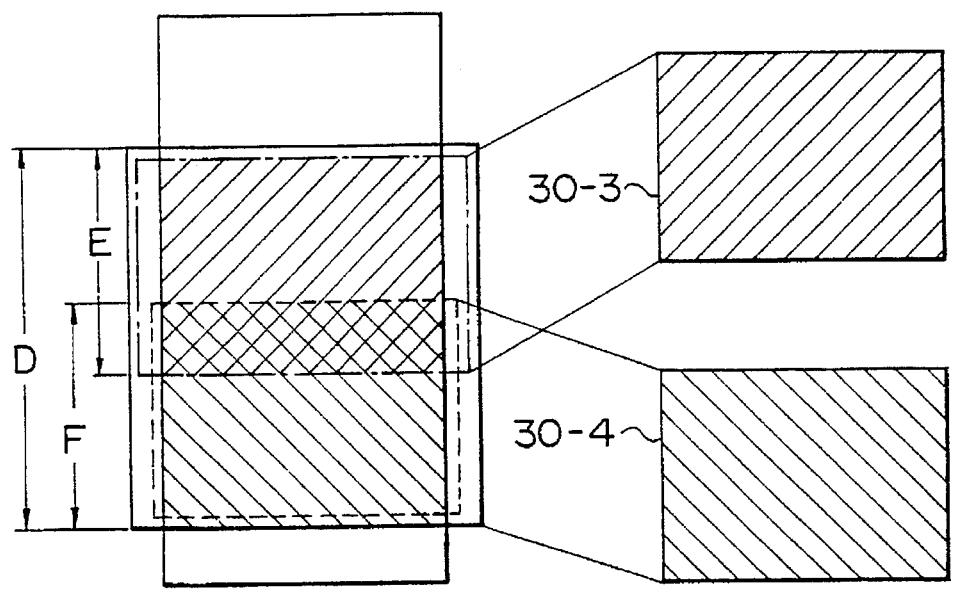
FIG. 5 is a diagram representing a restoration operation.

FIG. 5 represents the restoration operations in two cases where a bottom line is defined as the reference line and where a top line is defined as the reference line. It is assumed that a range D is a display range of a block of text before the restoration operation. If a top line of the display range D is defined as the reference line, the display range is changed from D to E by the restoration operation, and a screen 30-3 is displayed. If a bottom line of the display range D is defined as the reference line, the display range is changed from D to F by the restoration operation, and a screen 30-4 is displayed. Also in the restoration operation, an intermediate line may be defined as the reference line.

In the aforementioned example, the reference line in the reduction and restoration operations is fixed in advance or selected by a user. Alternatively, the reference line may be determined according to a direction of scrolling.

I claim:

1. A scrolling control system for scrolling data for display, selectively and controllably, in a standard size and in relatively reduced sizes, comprising:

a display device having a display capacity of displaying a standard amount of the standard size data;

an input device receiving inputs by a user specifying scrolling events of the data to be displayed and, in response, generating corresponding scroll initiate signals;

event detecting means for detecting the scrolling events of the data in response to the corresponding scroll initiate signals from the input device;

scrolling means for scrolling the data displayed on the display device in a designated direction so that new portions of the displayed data appear as existing portions of the displayed data disappear from view on the display device, when a corresponding one of the scrolling events is received from the event detecting means; and reducing means for reducing the standard size data, when scrolled by the scrolling means, to first relatively reduced size data in response to the scrolling events received from the event detecting means, thereby enabling display, by the display device, of an amount of said first relatively reduced size data which is increased relatively to the standard amount of the standard size data;

wherein the reducing means reduces the standard size data to the first relatively reduced size data when a first predetermined number of the scrolling events is successively received by the scrolling means.

2. The scrolling control system of claim 1, further comprising:

reduced scrolling indicating means for indicating when a reduction in the standard size data is to occur; and the reducing means reducing the standard size data only when the reduced scrolling indicating means indicates that the reduction of the standard size data is to occur.

3. The scrolling control system of claim 1, wherein the reducing means reduces the first relatively reduced size data to second relatively reduced size data when a second predetermined number of the scrolling events are successively received by the scrolling means subsequently to the reduction of the standard size data.

4. A scrolling control method in a computer system including a display device for displaying data and having a display capacity of a standard amount of the data of a standard size, said method comprising the steps of:

displaying the standard size data on the display device;

generating initial scroll initiate signals in response to corresponding, initial inputs by a user to initiate respective scrolling events of the data displayed on the display device;

detecting the scrolling events of the data displayed on the display device in response to the corresponding scroll initiate signals;

scrolling the standard size data displayed on the display device in response to detecting the initial scrolling events by the event detecting means so that new portions of the displayed data appear as existing portions of the displayed data disappear from view on the display device; and in response to receipt of a predetermined number of subsequent scroll initiate signals, reducing the standard size data scrolled by the scrolling means and displayed on the display device and thereby scrolling and displaying, on the display device, an increased amount, relatively to the standard amount on the display device, of relatively reduced data which is increased relatively to the standard amount of the standard size data displayed at the same time.

5. A scrolling control system for scrolling data for display, selectively and controllably, in a standard size and in relatively reduced sizes, comprising:

a display device having a display capacity of displaying a standard amount of the standard size data;

an input device receiving inputs by a user specifying scrolling events of the data to be displayed and, in response, generating corresponding scroll initiate signals;

event detecting means for detecting the scrolling events of the data in response to the corresponding scroll initiate signals from the input device, and for detecting when the scrolling of the data is to terminate;

scrolling means for scrolling the data displayed on the display device in a designated direction when a corresponding one of the scrolling events is received from the event detecting means;

reducing means for reducing the standard size data, when scrolled by the scrolling means, to first relatively reduced size data in response to the scrolling events received from the event detecting means, thereby enabling display, by the display device, of an amount of said first relatively reduced size data which is increased relatively to the standard amount of the standard size data, wherein the reducing means reduces the standard size data to the first relatively reduced size data when a first predetermined number of the scrolling events is successively received by the scrolling means; and restoring means for automatically restoring the first relatively reduced size data to the standard size data when the scrolling of the data is to terminate.

6. A scrolling control method for scrolling standard size data and reduced size data in designated directions on a display device having a display capacity of a standard amount of the standard size data, said scrolling control system comprising the steps of:

receiving one of cursor movement commands, indicating movement of a cursor on the display device, and scroll initiate commands, specifying when to initiate scrolling the standard size data from a user;

detecting receipt of one of the cursor movement commands, detecting whether a cursor is positioned at one of a bottom portion and a top portion of the display device in response to the detection of one of the cursor movement commands and scrolling the standard size data in one of the designated directions in response to the detection of the cursor at one of the bottom portion and top portion of the display device;

detecting receipt of one of the scroll initiate commands if said cursor movement command has not been received; and reducing the standard size data to the reduced size data and increasing an amount of the reduced size data displayed on the display device, above the standard amount of the standard size data in response to detection of one of a first predetermined number of successive scroll initiate commands and a second predetermined number of successive cursor movement commands.

7. The scrolling control method as claimed in claim 6, further comprising the step of:

determining whether the standard size data has been reduced to the reduced size data when the cursor movement commands and the scroll initiate commands are no longer detected and restoring the reduced size data to the standard size data if the standard size data has been reduced.

* * * * *